Sept. 25, 1923.

H. W. SULLIVAN 1,468,982

DUPLEX TELEGRAPHIC SYSTEM

Filed March 22, 1921

Inventor
Herbert Watson Sullivan,
by Bakewell, Byrnes & Parmelee
his attys.

Patented Sept. 25, 1923.

1,468,982

UNITED STATES PATENT OFFICE.

HERBERT WATSON SULLIVAN, OF LONDON, ENGLAND.

DUPLEX TELEGRAPHIC SYSTEM.

Application filed March 22, 1921. Serial No. 454,466.

*To all whom it may concern:*

Be it known that I, HERBERT WATSON SULLIVAN, a subject of the King of England, residing in London, England, have invented certain new and useful Improvements in Duplex Telegraphic Systems (for which application for patent has been filed in Great Britain, No. 11436/20, filed 24 April, 1920, and cognate application No. 5810/21, filed 21st February, 1921), of which the following is a specification.

This invention relates to duplex telegraphy, that is to say, telegraphic systems in which an artificial line is employed electrically to balance, in bridge formation, the actual cable or line. It has been customary to construct the artificial line of resisting condensers or alternatively condensers and resistances, to represent the capacity of the cable and the resistance of its conductor, and it has long been recognized that howsoever designed these are not an exact imitation of the distributed capacity of the cable or line. It has further been found in practice that the condenser portion of this apparatus as ordinarily constructed with metallic foil cut in grid or other form, and with paper saturated in paraffin wax differs in some of its electrical constants from the cable which it represents, and notably so with regard to the rate of absorption of the gutta percha or other insulator of the core as compared with the absorption of the waxed paper. One result of the said differences is imperfection in and variation of the balance, and it is the object of the present invention to reduce this to a further degree than has heretofore been done, with a view to improving the operation in general of duplex systems, and in particular for submarine telegraphy. The absorption effect is greatest at the home end of the artificial line as is well-known, and the present invention is directed to providing a capacity effect at the home end of the artificial line which shall more closely represent, in its absorption characteristics the absorption effect in the cable.

The present invention therefore provides in the artificial line a length of cable core whereof the ratio between the electrical constants is the same or substantially the same as that of the signalling cable core, and which is immersed in water. It is to be understood that the term "cable core" is intended to have the significance it ordinarily has in telegraph works, namely to denote the conductor of the cable together with its insulating covering.

In the accompanying drawings—

Figure 1:
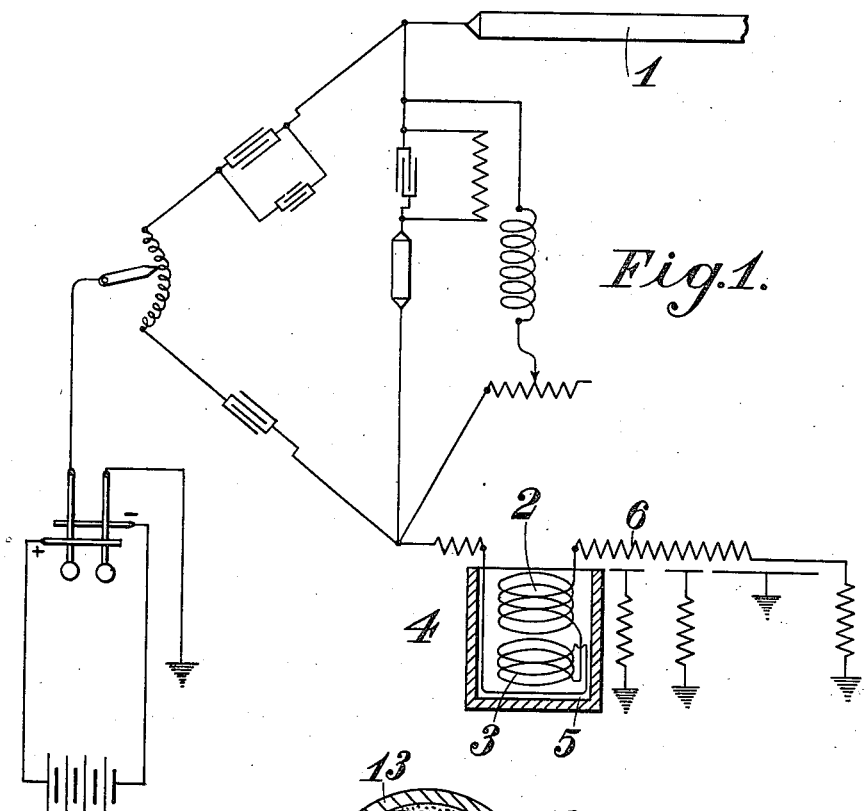
Figure 1 illustrates diagrammatically one method of carrying out this invention as applied to a modern duplex telegraph circuit.

As seen in Figure 1, a length of cable core having the same ratio of electric constants as the signalling cable core shown at 1 for transmitting signals, is taken and is formed into a non-inductive winding consisting of two coils 2, 3, the former coiled right-handedly and the latter left-handedly, and the two coils thus formed are laid with their coiling axes coincident with one another in a tank 4 filled with water 5.

The turns of the coils are arranged so as to allow the water to surround them to as great an extent as possible, this may be accomplished for example by providing the cable core with an absorbent covering so permitting the turns to be laid in contact with one another.

The length of cable thus provided is then connected in series with the artificial line at the home end in substitution for one or more of the artificial line boxes 6 ordinarily employed, so far, that is to say as is warranted by the length of cable coiled in the tank. Hence if the cable used in the tank is twenty miles in length, and is identical with that used for transmitting the signals, it is employed in substitution for twenty miles of artificial cable.

It will readily be understood that by coiling the cable in the manner above described, self induction in the coiled cable is neutralized by the mutual induction between the two halves. Where the absorption effect, however, is very great or where for other reasons it may be deemed desirable, the two coiled halves are not made precisely equal but the "half" electrically nearest to the home end is made to have fewer turns than the remainder. The difference is so selected that the total magnetic effect of the one "half" is equal to that of the other "half".

Figure 3:
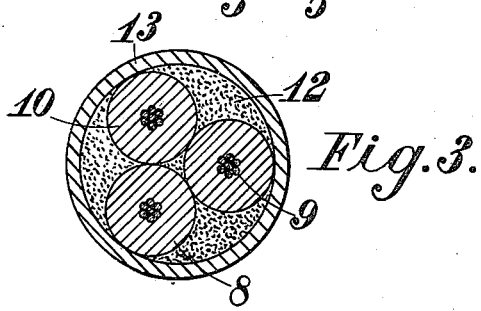
Figure 3 is a section through a cable such as is represented in Figure 2.
Figure 2:
Figure 2 is a diagrammatic elevation of a construction of composite cable affording an alternative method of carrying out this invention.

By the alternative method to which Figures 2 and 3 refer, a composite cable 7 is constructed as shown in Figure 2 comprising three cores 8, 9 and 10 which are all alike as to the ratio between their electric constants. The cores 8 and 9 are, however, in the form of a bight whose end distant from the shore end of the cable is indicated at 11. In order that they may be laid together conveniently the cores 8 and 9 are laid up with 10 as continuous lengths and the bight at 11 subsequently formed by joining the conductors here and insulating the joint. The three cores are made up with packing as at 12 and an outer covering as at 13 in any convenient or approved manner. For example, at the shore end the covering 13 will comprise the usual protective armouring. The separate ends 8 and 9 of what has thus become substantially a single conductor laid as a bight lengthwise along the cable are brought out where the end of the core 10 is accessible and are connected to the duplex system in substitution for the coils 2 and 3 of Figure 1. Thus if the core 10 has a capacity of, say, 0.35 microfarads per knot a length of 120 knots of the core 8, 9 doubled back upon itself so that it extends for a distance of 60 knots along the cable will replace two boxes in the artificial line. Again, if the core 10 has a capacity of 4 microfarads per knot, three boxes may be replaced by a bight extending about 78 knots along the cable 7.

The employment of such a core in either manner above described not only gives closer representation, in the artificial line, of the actual electrical constants of the cable in regard to absorption but also gives a more perfectly distributed capacity at the home end of the artificial line and this is advantageous in itself.

It will be understood that this invention is not limited to the use of the type of non-inductive winding illustrated in the drawing, but that any form of winding which eliminates self-induction may be used. Nor is the invention limited to the use, in the non-inductive coil, of cable identical as to conductor resistance or other electric constants with that used for transmitting the signals provided the ratio between these is the same. In practice, for economical and other reasons, when using identical cable cores for both the artificial and the real lines, it is found that for long distances the length employed in the artificial line as a non-inductive coil should be from 3% to 6% of the length of the real line, the remainder of this being represented in the artificial line by the usual condensers. The percentage of the real line, that is to say of the signalling cable core, that may be represented by the non-inductive coil is chiefly limited by the size of the coil or length of cable core thereby involved in the artificial line. One method of minimizing this limitation is to form the said coil from a length of special cable core constructed to have a greater resistance and capacity per unit length than the signalling cable core. The conductor may thus be of relatively small cross-section, and the capacity be increased at the appropriate rate by using thinner insulation, thereby maintaining the ratio of resistance to capacity. In this manner the size of the coil or length of cable core used in the artificial line may be greatly reduced so making it possible to replace a greater number, if not all, of the usual artificial line boxes, by the said coil.

In some cases it may be convenient, and it falls within this invention, to lay the length of cable core direct in the sea or in a river or the like instead of coiling it in a tank, the length being laid in a single loop, the ends of which are brought into the cable station and connected to the rest of the artificial line as are the ends of the coiled cable first above referred to. The core may be protected with sheathing in any convenient manner, for example as is the actual cable itself, and moreover, the coiled core first above referred to may be protected by braiding or otherwise. The term "core" is to be understood as including any such protected core.

What I claim as my invention and desire to secure by Letters Patent is:—

1. An artificial line for telegraphy, comprising a length of cable core immersed in water, the ratio of the electrical constants of which is the same or substantially the same as that of the signaling core.

2. An artificial line for telegraphy, which comprises a length of cable core immersed in water, the ratio of the electrical constants of which is the same or substantially the same as that of the signaling core, and line boxes in circuit therewith.

3. An artificial line for telegraphy, which comprises two co-axially coiled lengths of cable core in series with one another and immersed in water, said coils being oppositely wound.

4. An artificial line for telegraphy, which comprises two co-axially oppositely wound coiled lengths of cable core in series with one another and immersed in water, and line boxes in circuit therewith.

In testimony whereof I affix my signature.

HERBERT WATSON SULLIVAN.